United States Patent
Han et al.

(10) Patent No.: US 12,317,363 B2
(45) Date of Patent: May 27, 2025

(54) METHOD AND APPARATUS FOR ALIGNING SIDELINK DRX CONFIGURATION

(71) Applicant: Lenovo (Beijing) Ltd., Beijing (CN)

(72) Inventors: Jing Han, Chaoyang District (CN); Haiming Wang, Xicheng District (CN); Lianhai Wu, Chaoyang (CN); Ran Yue, Haidian District (CN); Jie Shi, Haidian District (CN); Jie Hu, Changping District (CN)

(73) Assignee: Lenovo (Beijing) Ltd., Beijing (CN)

( * ) Notice: Subject to any disclaimer, the term of this patent is extended or adjusted under 35 U.S.C. 154(b) by 304 days.

(21) Appl. No.: 17/793,798

(22) PCT Filed: Jan. 22, 2020

(86) PCT No.: PCT/CN2020/073853
§ 371 (c)(1),
(2) Date: Jul. 19, 2022

(87) PCT Pub. No.: WO2021/147011
PCT Pub. Date: Jul. 29, 2021

(65) Prior Publication Data
US 2023/0064488 A1   Mar. 2, 2023

(51) Int. Cl.
*H04W 76/28* (2018.01)
*H04W 76/14* (2018.01)

(52) U.S. Cl.
CPC ............ *H04W 76/28* (2018.02); *H04W 76/14* (2018.02)

(58) Field of Classification Search
CPC ..... H04W 76/14; H04W 76/15; H04W 76/23; H04W 76/27; H04W 76/28;
(Continued)

(56) References Cited

U.S. PATENT DOCUMENTS

| 2016/0366645 A1 | 12/2016 | Song et al. |
| 2017/0019820 A1 | 1/2017 | Das |

(Continued)

FOREIGN PATENT DOCUMENTS

| CN | 107306423 A | 10/2017 |
| CN | 109891947 A | 6/2019 |

(Continued)

OTHER PUBLICATIONS

20914872.5, "Extended European Search Report", EP Application No. 20914872.5, Sep. 11, 2023, 14 pages.
(Continued)

*Primary Examiner* — Peter Chen
(74) *Attorney, Agent, or Firm* — FIG. 1 Patents (57) ABSTRACT

The present application relates to a method and apparatus for aligning sidelink DRX configuration. One embodiment of the subject application provides a method for sidelink communication, comprising: receiving, from a second User Equipment (UE), a second request for one or more sidelink Discontinuous Reception (DRX) configurations, wherein the second request includes assisting information; and transmitting, by the first UE, the one or more sidelink DRX configurations determined based on the assisting information to the second UE.

20 Claims, 7 Drawing Sheets

(58) Field of Classification Search
CPC . H04W 52/0216; H04W 92/18; H04W 72/23; H04W 72/25; H04W 4/46; H04W 4/70
See application file for complete search history.

(56) References Cited

U.S. PATENT DOCUMENTS

| | | | | |
|---|---|---|---|---|
| 2021/0059005 | A1* | 2/2021 | Hosseini | H04W 76/11 |
| 2022/0408405 | A1* | 12/2022 | Li | H04W 76/10 |
| 2023/0014303 | A1* | 1/2023 | Di Girolamo | H04W 72/20 |

FOREIGN PATENT DOCUMENTS

| | | |
|---|---|---|
| CN | 105379406 B | 12/2019 |
| EP | 3442276 A1 | 2/2019 |
| EP | 3451709 A1 | 3/2019 |
| EP | 3499975 A1 | 6/2019 |
| EP | 4084513 A1 | 11/2022 |
| WO | 2018016882 A1 | 1/2018 |
| WO | 2018028416 A1 | 2/2018 |
| WO | 2021119474 A1 | 6/2021 |

OTHER PUBLICATIONS

ZTE , "Discussion on PC5 DRX", 3GPP TSG-RAN WG2 Meeting #98, R2-1704634, Hangzhou, China [retrieved Sep. 12, 2023]. Retrieved from the Internet <https://www.3gpp.org/ftp/tsg_ran/WG2_RL2/TSGR2_98/Docs/>, May 2017, 4 pages.

LG Electronics , "New WID on NR sidelink enhancement", 3GPP TSG RAN Meeting #86, RP-193231, Sitges, Spain [retrieved Aug. 4, 2022]. Retrieved from the internet <https://www.3gpp.org/ftp/TSG_RAN/TSG_RAN/TSGR_86/Docs/>., Dec. 2019, 6 Pages.

PCT/CN2020/073853 , "International Preliminary Report on Patentability", PCT Application No. PCT/ CN2020/073853, Aug. 4, 2022, 6 pages.

PCT/CN2020/073853 , "International Search Report and Written Opinion", PCT Application No. PCT/CN2020/073853, Nov. 2, 2020, 8 pages.

"Foreign Office Action", CN Application No. 202080094344.7, Nov. 29, 2024, 34 pages.

202080094344.7 , "Foreign Office Action", CN Application No. 202080094344.7, Jul. 30, 2024, 38 pages.

Huawei , "Some considerations about DRX on PC5", 3GPP TSG RAN WG2#98, R2-1704718, Retrieved from the Internet: <URL:http://www.3gpp.org/ftp/tsg_ran/WG2_RL2/TSGR2_98/Docs/>, May 5, 2017, 4 pages.

\* cited by examiner

METHOD AND APPARATUS FOR ALIGNING SIDELINK DRX CONFIGURATION

TECHNICAL FIELD

The subject application relates to wireless communication technology, and more particularly, related to a method and apparatus for aligning sidelink (SL) discontinuous reception (DRX) configuration.

BACKGROUND OF THE INVENTION

In 3GPP ($3^{rd}$ Generation Partnership Project) Release 16, the NR (New Radio) sidelink assumes that the UEs (User Equipment) are always on during a sidelink communication. In other words, the sidelink only focuses on the UEs installed in vehicles with sufficient battery capacity. In Release 17, in order to save power for the UEs with battery constraint, the DRX configuration including parameters such as on-duration, off-duration, and wake-up time are introduced to sidelink communication.

Therefore, it is desirable to provide a solution for aligning the DRX configuration in sidelink communication among the UEs.

SUMMARY

It is desirable to provide a solution for aligning the DRX configuration in sidelink communication.

One embodiment of the subject application provides a method for sidelink communication, comprising: receiving, from a second User Equipment (UE), a second request for one or more sidelink Discontinuous Reception (DRX) configurations, wherein the second request includes assisting information; and transmitting, by the first UE, the one or more sidelink DRX configurations determined based on the assisting information to the second UE.

Another embodiment of the subject application provides a method for sidelink communication, comprising: receiving, from a first User Equipment (UE), a first request for the one or more sidelink DRX configurations, wherein the first request includes assisting information from a second UE; and determining, by a first Base Station (BS), a response based on the assisting information.

Yet another embodiment of the subject application provides an apparatus, comprising: a non-transitory computer-readable medium having stored thereon computer-executable instructions; a receiving circuitry; a transmitting circuitry; and one or more processors coupled to the non-transitory computer-readable medium, wherein the computer-executable instructions cause the one or more processors to implement the method for sidelink communication, comprising: receiving, from a second User Equipment (UE), a second request for one or more sidelink Discontinuous Reception (DRX) configurations, wherein the second request includes assisting information; and transmitting, by the first UE, the one or more sidelink DRX configurations determined based on the assisting information to the second UE.

Still another embodiment of the subject application provides an apparatus, comprising: a non-transitory computer-readable medium having stored thereon computer-executable instructions; a receiving circuitry; a transmitting circuitry; and one or more processors coupled to the non-transitory computer-readable medium, wherein the computer-executable instructions cause the one or more processors to implement the method for sidelink communication, comprising: receiving, from a first User Equipment (UE), a first request for the one or more sidelink DRX configurations, wherein the first request includes assisting information from a second UE; and determining, by a first Base Station (BS), a response based on the assisting information.

DETAILED DESCRIPTION

The detailed description of the appended drawings is intended as a description of the currently preferred embodiments of the present invention, and is not intended to represent the only form in which the present invention may be practiced. It should be understood that the same or equivalent functions may be accomplished by different embodiments that are intended to be encompassed within the spirit and scope of the present invention.

Embodiments provide a method and apparatus for aligning sidelink DRX configuration. To facilitate understanding, embodiments are provided under specific network architecture and new service scenarios, such as 3GPP 5G, 3GPP LTE Release 8 and so on. Persons skilled in the art know very well that, with the development of network architecture and new service scenarios, the embodiments in the present disclosure are also applicable to similar technical problems.

In Release 16, the Sidelink Radio Bearer (SLRB) parameters among peer UEs are aligned for unicast transmission of the NR V2X (Vehicle to Everything) communication. Specifically, for sidelink unicast, the initiating UE needs to align the following SLRB configurations with the peer UEs: 1) SLRB configurations configured by the Network or pre-configured which include the SLRB parameters only related to transmission, and 2) the SLRB parameters which are related to both transmission and reception. For sidelink unicast, a UE is not allowed to configure "SLRB parameters only related to transmission" for the peer UE in sidelink via PC5 RRC message.

As can be seen, the SLRB configurations that need to be aligned are configured by Network, for example, the Base Station (BS), or configured in advance, e.g. pre-configuration. Then the initiating UE will inform these configurations to the peer UEs.

Furthermore, power saving enables the UEs with battery constraint to perform sidelink operations in a power efficient manner. The NR sidelink communication in Release 16 is performed based on the assumption that the UE is "always-on", e.g., only focusing on UEs installed in vehicles with sufficient battery capacity.

In Release 17, solutions for power saving are required for the vulnerable road users (VRUs) in V2X use cases and for the UEs in public safety and commercial use cases where power consumption in the UEs needs to be minimized.

Accordingly, one objective for power saving in Release 17 is for sidelink DRX, and corresponding working scope is as follows: regarding sidelink DRX for broadcast, groupcast, and unicast, 1) define on-durations and off-durations in sidelink and specify the corresponding UE procedure; 2) specify mechanism aiming to align sidelink DRX wake-up time among the UEs communicating with each other; and 3) specify mechanism aiming to align sidelink DRX wake-up time with Uu DRX wake-up time of an in-coverage UE.

The DRX configurations among the sidelink UEs need to be aligned such the data transmission would not be missed at the receiver's side, at the same time, power consumption of the receiver also needs to be minimized. In addition, the DRX configuration of a UE in a side link communication and the Uu configuration of the UE also need to be aligned.

At present, groupcast, unicast communication, and broadcast transmission are all introduced for NR V2X, and the subject disclosure focuses on the DRX alignment for unicast.

In particular, the subject disclosure aims to align the sidelink DRX configuration among the UEs communicating with each other for unicast transmission, and to align sidelink DRX configuration with Uu DRX configuration if the UEs are in coverage of the BS s.

In the subject disclosure, the sidelink DRX configuration may include the following parameters:
i) On duration, the on duration indicates the duration of the UE is in the "on" state, or "wake up", and is controlled by a timer. The parameter on duration period is derived based on the SFN (System Frame Number), DFN (Direct Frame Number), or resource pool on sidelink.
ii) Start offset of on duration, the start offset of on duration defines the start position of on duration on sidelink.
iii) Inactive time, the inactive time means the UE is active or wake up when the timer is running, and is controlled by a timer. The inactive time is started by new data transmission on sidelink.
iv) HARQ RTT (Hybrid Automatic Repeat Request Round-trip time) time: controlled by a timer, and enabled when HARQ feedback based retransmission is enabled on sidelink.
v) HARQ retransmission time: controlled by a timer, and to monitor HARQ retransmissions on sidelink.
vi) Next reservation time: controlled by a timer, and this parameter monitors the next transmission on sidelink.
vii) Active time/wake-up time: during the active time or wake-up time, the UE is actively monitor sidelink for data transmissions, and controlled by a timer.

The sidelink DRX configuration involves multiple timers, and may further include other parameters, and the subject disclosure has no intention of limiting the types of the parameters.

The sidelink DRX configuration for the sidelink UEs may be configured by the Network or pre-configured. For example, the sidelink DRX configuration could be broadcasted in system information for sidelink communication, such as: System Information Block (SIB); the sidelink DRX configuration could be transmitted in dedicate RRC signaling for a specific sidelink UE, or the sidelink DRX configuration could be pre-configured. For instance, the sidelink UE may be installed with a SIM (Subscriber Identity Module) card which includes the pre-configured sidelink DRX configuration.

The sidelink DRX configuration could be for a specific destination ID (identity), which means the sidelink DRX configuration is for a specific service. In this disclosure, several embodiments regarding associating the sidelink DRX configuration are presented as follows:
i) The sidelink DRX configuration is associated with one SLRB configuration and one SLRB ID.
ii) The sidelink DRX configuration is associated with one Quality of Service (QoS) flow and one QoS flow ID;
iii) The sidelink DRX configuration is associated with one PQI (PC5 Qos Index).
iv) The sidelink DRX configuration is associated with one logical channel configuration and one logical channel ID.
v) The sidelink DRX configuration is associated with one unicast link and unicast link ID, the unicast link ID could be combination of sidelink source ID and sidelink destination ID.
vi) The sidelink DRX configuration is associated with one destination ID.
vii) The sidelink DRX configuration is associated with one source ID.

When there are multiple services are communicating on sidelink unicast link, e.g. the sidelink UE has multiple SLRBs, QoS flows, logical channels, or destination IDs, and the sidelink DRX configurations are different for different services, the UE wakes up to monitor sidelink communications during the period where at least one of DRX configuration is in active time according to sidelink DRX procedure. In other words, the UE wakes up to monitor sidelink communications if at least one timer of the on duration timer, the retransmission timer, the inactivity timer, the next reservation timer, etc. is running. If the number of services is large enough, the UE may always stay in wake-up state to monitor the sidelink communications.

Alternatively, the sidelink DRX configuration could be for a specific resource pool. For instance, if the sidelink DRX configuration is configured in pre-configuration or broadcasted in a SIB message, the sidelink DRX configuration is associated with at least one resource pool configuration and one resource pool ID. In this case, the sidelink DRX configuration depends on the resource pool configuration, e.g. on duration and start position of the on duration of the sidelink DRX is defined as the offset of start position of corresponding resource pool. For a specific resource pool, the subset of resource pool resource can be configured as active time for sidelink unicast transmission.

Furthermore, the configurations could be related to both a specific destination ID and a resource pool at the same time. That is, for a specific resource pool, multiple set of DRX parameter configurations which associated with multiple services can be configured.

If a UE is configured with a specific resource pool, and also configured with a sidelink DRX configuration, however, the above two configurations are separately configured, which means the two configurations may be aligned with each other, or not. Under the condition that the resource pool is not aligned with the DRX configuration, the UE would not enter into the active time, or would not activate any timer, either. In another word, a UE only performs the DRX operation in time domain when there is a configured resource pool, and the UE only enters on duration or active time or wakes up with the configured resource in the resource pool.

Figure 1:
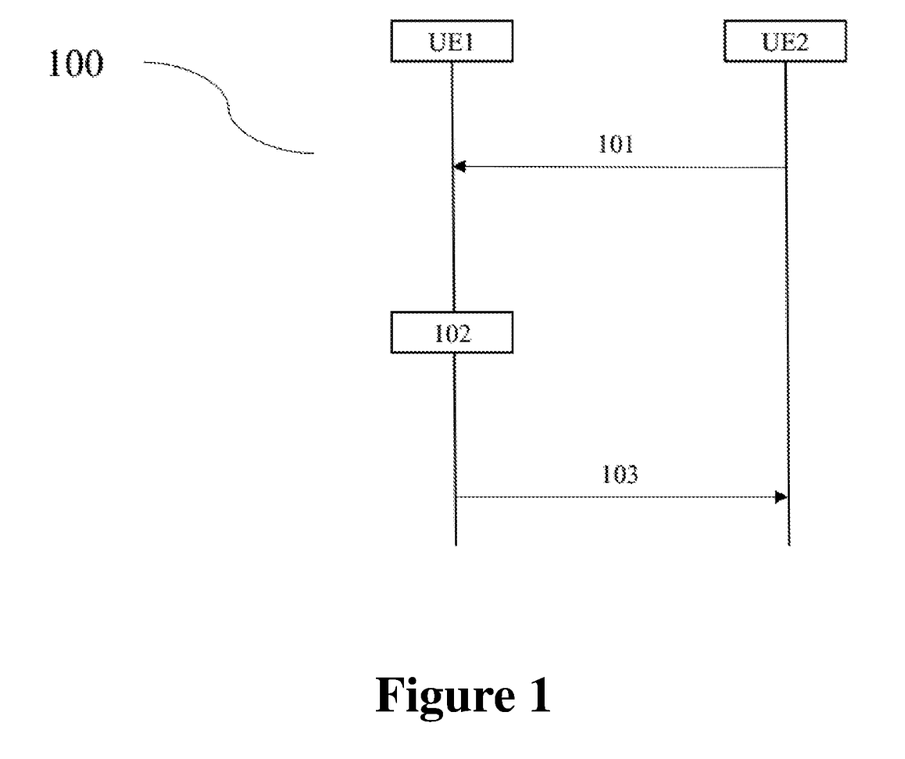
FIG. 1 depicts a flow chart 100 illustrating a method for aligning sidelink DRX configuration according to a preferred embodiment of the subject disclosure.

FIG. 1 depicts a flow chart 100 illustrating a method for aligning sidelink DRX configuration according to a preferred embodiment of the subject disclosure. In FIG. 1, UE1 represents the initiating UE, which initiates the sidelink communication, and UE2 is the peer UE, which is the UE with which UE1 intends to communicate.

In step 101, UE2 sends a request to UE1, requesting the sidelink DRX configuration. The request could be transmitted to UE1 during or after the establishment of the unicast connection between UE1 and UE2. In other words, in or after PC5-RRC signaling for radio configuration or capability message, UE2 can inform UE1 the sidelink DRX configuration request. The request from UE2 includes several different types of assistance information.

In one embodiment, the request from UE2 includes some information regarding UE2 per se. For instance, UE2 can use one bit to indicate UE1 that UE2 is a power sensitive UE; UE2 may use one bit to indicate UE1 that UE2 requests for low power data transmission; or UE2 can indicate it requests for sidelink configuration with one bit.

In another embodiment, the request from UE2 includes some information regarding the Uu DRX configuration, which relates to the DRX configuration between UE2 and the serving Base Station (BS) of UE2 (hereinafter referred to as BS2). Under this condition, UE2 is within the coverage of BS2, and UE1 can use the Uu DRX configuration from UE2 to determine the sidelink DRX configuration. This Uu DRX configuration can be the DRX configuration in RRC (Radio Resource Control) CONNECTED mode, and it can also be the DRX configuration in IDLE or INACTIVE mode. The assistance information may also include the traffic pattern and UE2's capability information.

In still another embodiment, the request from UE2 includes some information regarding the BS2 (not shown in FIG. 1). For example, the ID of BS2, or the ID of the cell where UE2 is served.

In step 102, UE1 checks the existing sidelink DRX configuration, or the initial sidelink DRX configuration, which may be broadcasted in the SIB to UE1, or transmitted in dedicate RRC signaling for UE1, or preconfigured as discussed above. Taking the assisting information from UE2, such as the traffic pattern, the Uu DRX configuration, UE2's capability, UE1 determines that the existing sidelink DRX configuration can satisfy the requirement from UE2, then UE1 sends the sidelink DRX configuration to UE2 in step 103.

In another embodiment, if UE1 is not in the coverage of a serving BS, then UE1 would also check the existing sidelink DRX configuration, and transmits the existing sidelink DRX configuration to UE2 in step 103.

Figure 2A:
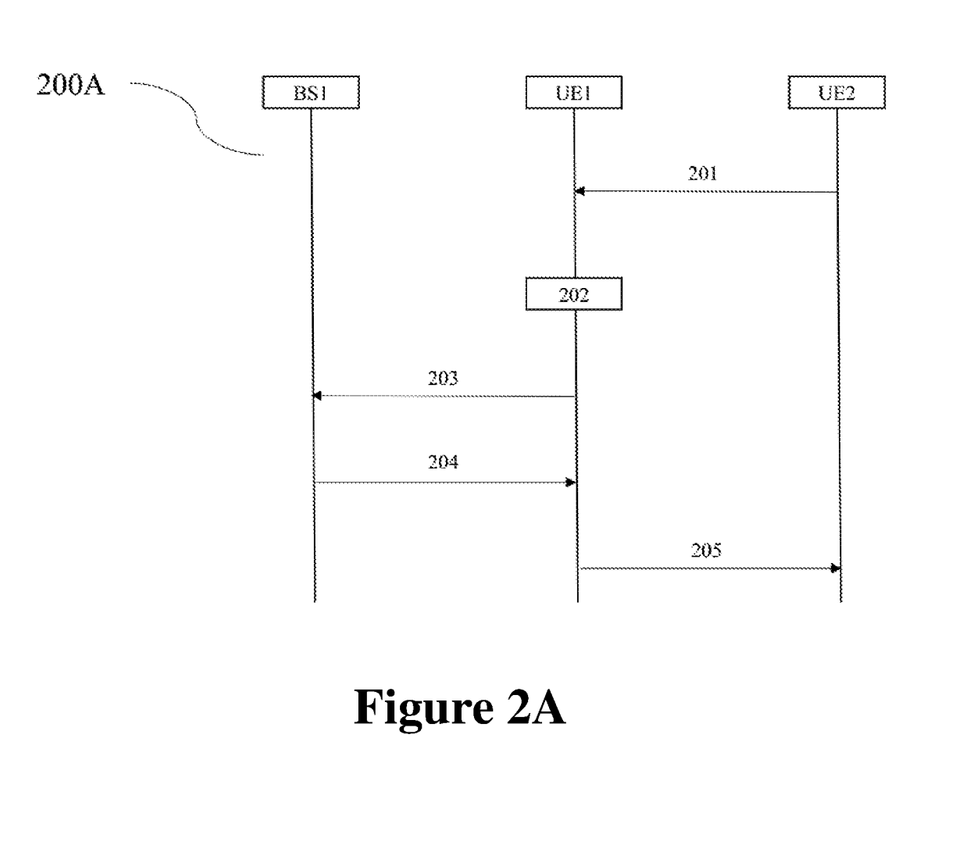
FIG. 2A depicts a flow chart 200A illustrating a method for aligning sidelink DRX configuration according to a preferred embodiment of the subject disclosure.
Figure 2B:
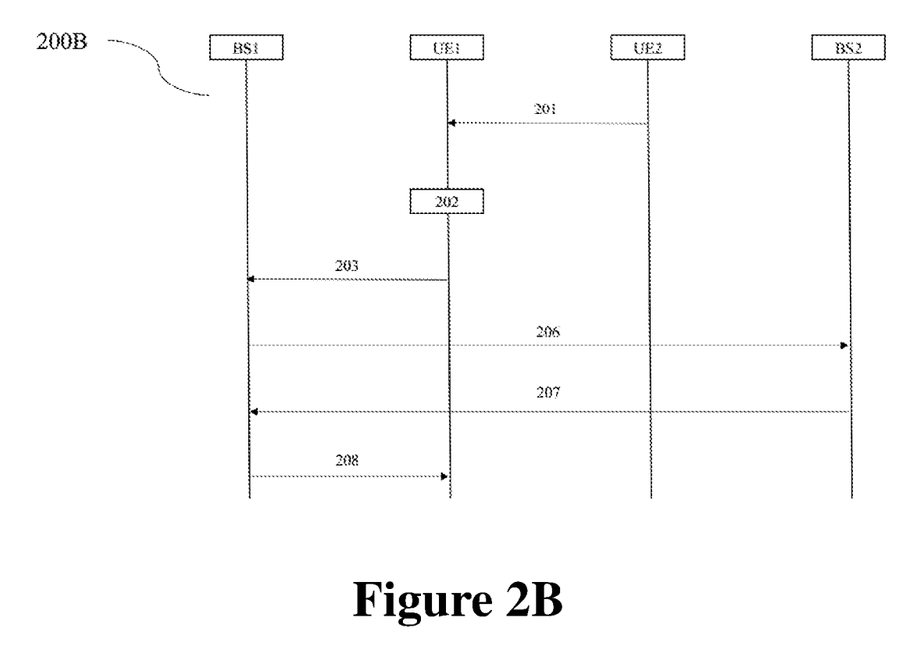
FIG. 2B depicts a flow chart 200B illustrating a method for aligning sidelink DRX configuration according to a preferred embodiment of the subject disclosure.

FIG. 2A depicts a flow chart 200A illustrating a method for aligning sidelink DRX configuration according to a preferred embodiment of the subject disclosure. FIG. 2B depicts a flow chart 200B illustrating a similar method as that in FIG. 2A. In FIGS. 2A and 2B, UE1 represents the initiating UE, which initiates the sidelink communication, UE2 is the peer UE, which is the UE with which UE1 intends to communicate, BS1 is the serving BS of UE1, and BS2 is the serving BS of UE2. If UE1 and UE2 are within the same cell, then BS1 and BS2 are the same BS.

The step 201 in FIG. 2A is identical to the step 101 in FIG. 1, and the details are omitted here.

In step 202, after checking the existing DRX configuration, UE1 determines that the existing DRX configuration cannot meet the requirements of UE2, and UE1 is also in the coverage of BS1, then UE1 decides to request the sidelink DRX configurations from BS1.

In step 203, the UE1 sends a sidelink DRX configuration request message to BS1. If UE1 is in an IDLE or INACTIVE mode, it has to trigger a RRC connection setup procedure with BS1 before transmitting the sidelink DRX configuration request message to BS1. If UE1 is in the RRC-connected mode, which means the UE1 is already RRC connected with BS1, then UE1 can sends a sidelink DRX configuration request message to BS1.

UE1 can include the assisting information from UE2 in the request message. As discussed above, for example, the assisting information from UE2 includes the information regarding UE2 per se, the Uu DRX configuration between UE2 and BS2, the information regarding BS2, and/or the traffic pattern and UE capability information. This assisting information from UE2 can help BS1 to determine the sidelink DRX configuration to be transmitted to UE 1. For instance, BS1 can configure a sidelink DRX configuration so that sidelink wake up time and Uu wake up time for UE2 can be aligned.

In step 204, the BS1 determines the sidelink DRX configuration and transmit the same to UE 1. According to different assisting information included in the request, the BS1 performs different operation to determine the sidelink DRX configurations to be transmitted to the UE1.

In one embodiment, the assisting information included in the request is the Uu DRX configuration of UE2 and/or the traffic pattern on sidelink. Taking this information into consideration, the BS1 may send different responses. For one example, the BS1 can use one bit in the response which indicates UE1 to reuse the Uu DRX configuration of UE2. For another example, the BS1 sends a delta signalling based on the Uu DRX configuration, to modify part of Uu DRX parameters for the purpose of sidelink DRX configuration. When UE1 receives the delta signalling, UE1 will modify the Uu DRX configuration of UE2 based on the delta signalling, and use the modified Uu DRX configuration as the sidelink DRX configuration, then sends the modified Uu DRX configuration to UE2 in step 205. For yet another example, the BS1 may configure a new set of sidelink DRX parameters, and transmit the sidelink DRX configuration including the new set of sidelink DRX parameters to UE 1.

In another embodiment, the assisting information included in the request from UE2 in step 201 is the information of BS2, the cell ID of UE2, and/or the information whether Uu DRX is configured. As shown in FIG. 200B, after receiving such a request, in step 206, with the information of BS2, the BS1 can communicate with BS2 directly, for example, communicate via e.g. Xn interface, and request information of Uu DRX configuration for UE2. Then in step 207, BS2 sends the Uu DRX configuration of UE2 to BS1, and BS1 configures the sidelink DRX configuration taking the Uu DRX configuration of UE2 into consideration. In step 208, BS1 sends the response to UE1, which may indicate UE1 to reuse the Uu DRX configuration of UE2, or a delta signalling, or a new sidelink DRX configuration as recited above.

Alternatively, in step 206 in FIG. 200B, BS1 may indicate sidelink DRX configuration to BS2. Then BS2 can update sidelink DRX configuration according to Uu DRX configuration of UE2, and indicate the updated sidelink DRX configuration to UE2.

After the above steps, the sidelink DRX configuration and the Uu DRX configuration of UE2 are aligned.

Figure 3:
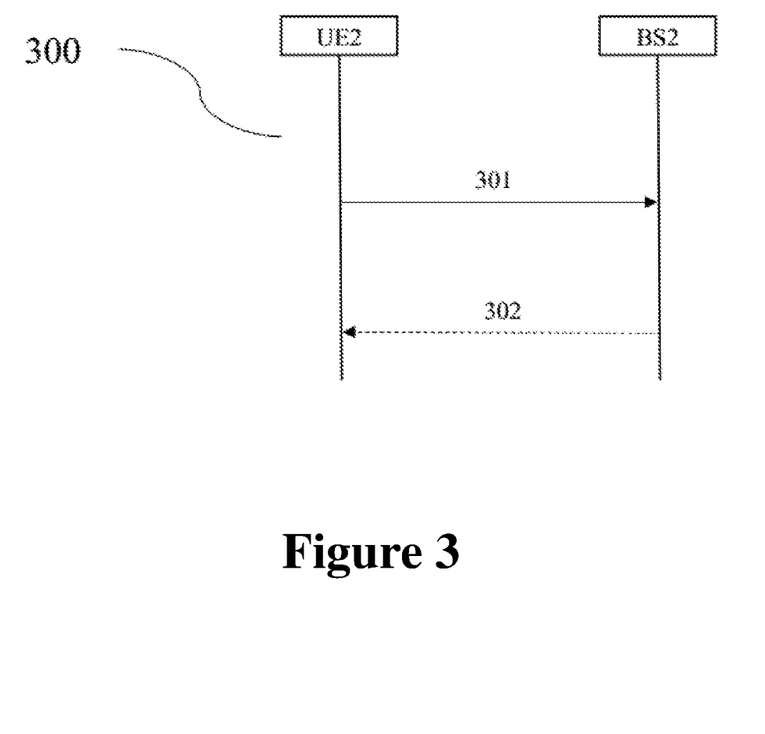
FIG. 3 depicts a flow chart 300 illustrating a method for aligning sidelink DRX configuration according to a preferred embodiment of the subject disclosure.

FIG. 3 depicts a flow chart 300 illustrating a method for aligning sidelink DRX configuration according to a preferred embodiment of the subject disclosure. The method step in FIG. 3 takes place when UE2 is in coverage of BS2, and is in RRC CONNECTED mode. In step 301, after receiving the sidelink DRX configuration from UE1, or an update of the sidelink DRX configuration, UE2 reports sidelink DRX configuration to BS2. UE 2 can report the sidelink DRX configuration with the sidelink DRX configuration included in the UE assistance information.

In step 302, after receiving the sidelink DRX configuration from UE2, BS2 may update or configure Uu DRX configuration for UE2, and transmit the same to UE2. If the Uu DRX configuration does not need to be updated, then BS2 does not need to transmit the Uu DRX configuration to UE2. In this way, the sidelink DRX configuration and the Uu DRX configuration of UE2 are aligned.

Figure 4:
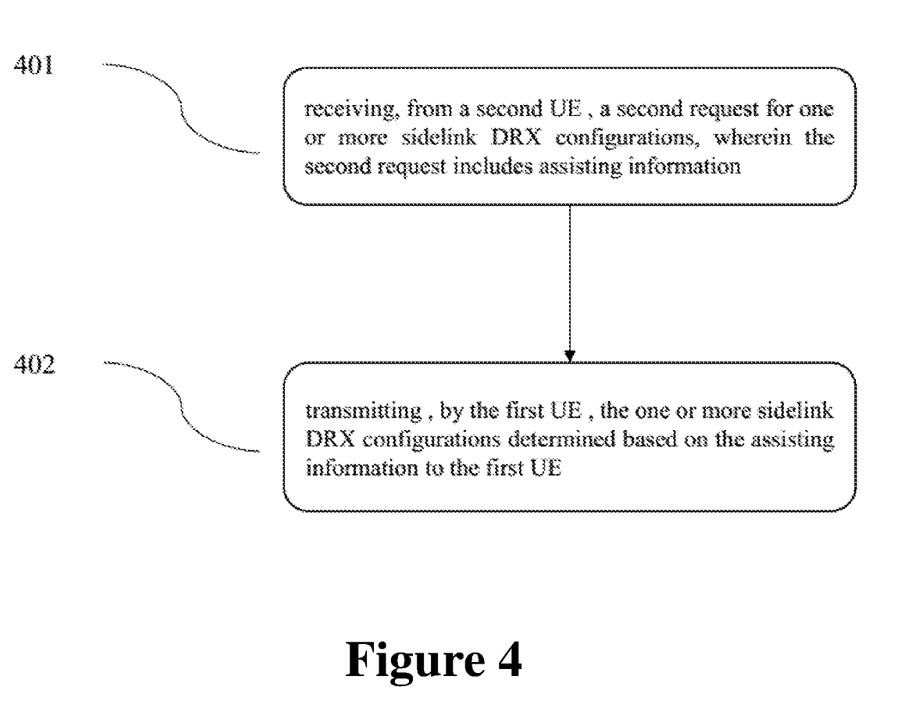
FIG. 4 depicts a method performed by a UE according to a preferred embodiment of the subject disclosure.

FIG. 4 illustrates a method performed by a UE for wireless communication according to a preferred embodiment of the subject disclosure.

In step 401, a UE1 receives from a UE2, a second request for one or more sidelink DRX configurations, and the second request includes assisting information, in step 402, UE1 transmits the one or more sidelink DRX configurations determined based on the assisting information to UE2. This method is also shown in FIG. 1. UE2 may send the second request during or after a unicast connection between UE1 and UE2 being established.

UE1 is configured with a number of initial sidelink DRX configurations, which are broadcasted in a SIB, transmitted with dedicate RRC signaling, or pre-configured. For example, a sidelink DRX configuration may include at least one of the following parameters: on duration; start offset of on duration; inactive time; HARQ RTT time; HARQ retransmission time; next reservation time; and active time. Furthermore, a sidelink DRX configuration is associated with at least one of the following parameters: one SLRB configuration and one SLRB ID; one QoS flow and one QoS flow ID; one PQI; one logical channel configuration and one logical channel ID; one unicast link and unicast link ID; one destination ID; and one source ID.

In one embodiment, UE1 may have multiple destination IDs, which means UE1 have multiple services at the same time, and UE1 enters into an "on" mode, or "wake up" mode, to monitor the sidelink communication during each on duration associated with each destination ID.

In another embodiment, each sidelink DRX configuration is associated with a resource pool configuration and a resource pool ID. When the sidelink DRX configuration is unaligned with the corresponding resource pool configuration, UE2 would not enter into the "on" mode, or "wake up" mode during the on duration associated with a sidelink DRX configuration.

The assisting information from UE2 includes several types of parameters, for example, it may be the requirements of UE2 per se, e.g. UE2 is power sensitive. The assisting information may be the Uu DRX configuration between the UE2 and BS2, which includes the Uu DRX configuration in the RRC-CONNECTED mode, or DRX configuration in IDLE/INACTIVE mode.

In another embodiment, the UE1 further transmits the one or more initial sidelink DRX configurations to UE2 when UE1 determines that the initial sidelink DRX configurations are sufficient to satisfy the requirements of UE2, or when UE1 is out of coverage of a BS. When UE1 is out of coverage of a BS, UE1 has no choice in addition to sending the initial sidelink DRX configurations since UE1 cannot reach a BS for additional sidelink DRX configurations.

Alternatively, when UE1 is in coverage of BS1, and the initial sidelink DRX configurations do not satisfy the requirements of UE2, UE1 transmits a request for one or more sidelink DRX configurations to BS1, and determines the one or more sidelink DRX configurations based on the response from BS1. Before sending the request, if UE1 is in the IDLE mode, it has to initiate a RRC connection with the BS1. The response from BS1 has different types: 1) the response indicates one or more new sidelink DRX configurations; 2) the response indicates UE1 to use the Uu DRX configuration of UE2; and 3) the response indicates UE1 to use a portion of the Uu DRX configuration of UE2 and update the other portion of the Uu DRX configuration of UE2.

In another embodiment, the assisting information from UE2 includes the information of BS2, the cell ID of UE2, and/or the information whether Uu DRX is configured. After receiving this type of assisting information, BS1 may communicate with BS2 directly, and requests the Uu DRX configuration of UE2 from BS2, then determines the response based on the received Uu DRX configuration. After the determination, the BS1 transmits the response to UE1. The response also has different types as discussed above.

In one embodiment, after receiving the sidelink DRX configuration from UE1, UE2 reports the same to BS2. BS2 then updates the Uu configuration of UE2 based on the sidelink DRX configuration.

Figure 5:
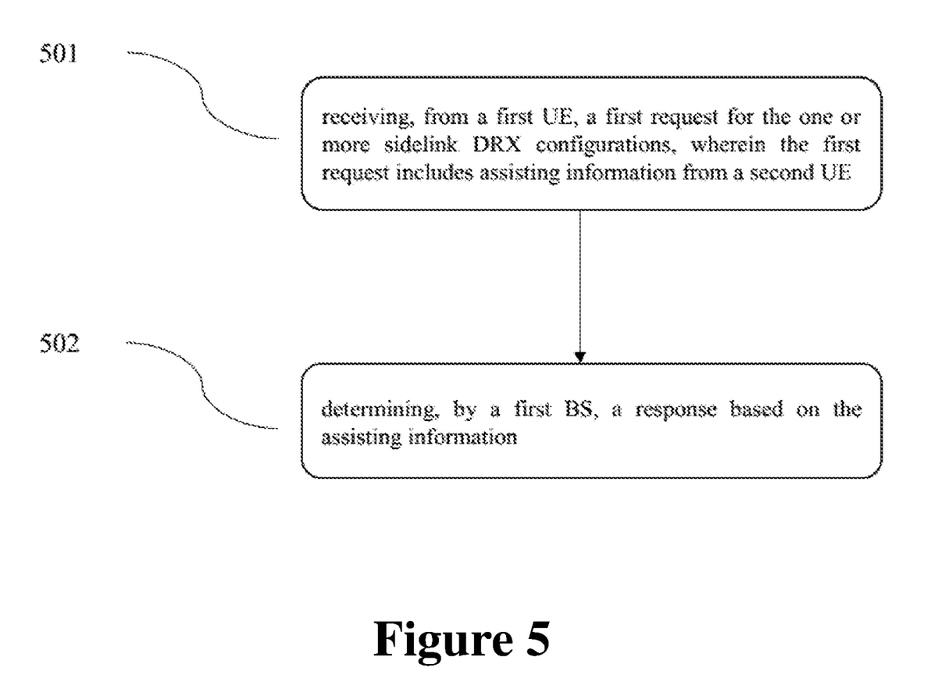
FIG. 5 depicts a method performed by a BS according to a preferred embodiment of the subject disclosure.

FIG. 5 illustrates a method performed by a BS for wireless communication according to a preferred embodiment of the subject disclosure. In step 501, BS1 receives a request for one or more sidelink DRX configurations from UE1, and the request includes the assisting information from UE2. In step 502, BS1 determines the response based on the assisting information.

The assisting information from UE2 includes several types of parameters, for example, it may be the requirements of UE2 per se, e.g. UE2 is power sensitive. The assisting information may be the Uu DRX configuration between the UE2 and BS2, which includes the Uu DRX configuration in the RRC-CONNECTED mode, or DRX configuration in IDLE/INACTIVE mode.

Taking the assisting information of UE2 into consideration, BS1 may send a response such as: 1) the response indicates one or more new sidelink DRX configurations; 2) the response indicates UE1 to use the Uu DRX configuration of UE2; and 3) the response indicates UE1 to use a portion of the Uu DRX configuration of UE2 and update the other portion of the Uu DRX configuration of UE2.

The assisting information from UE2 may further include the information of BS2, the cell ID of UE2, and/or the information whether Uu DRX is configured. After receiving the assisting information, BS1 communicates with BS2 and requests the Uu DRX configuration of UE2 from BS2, then determines the response based on the received Uu DRX configuration. After the determination, the BS1 transmits the response to UE1.

Figure 6:
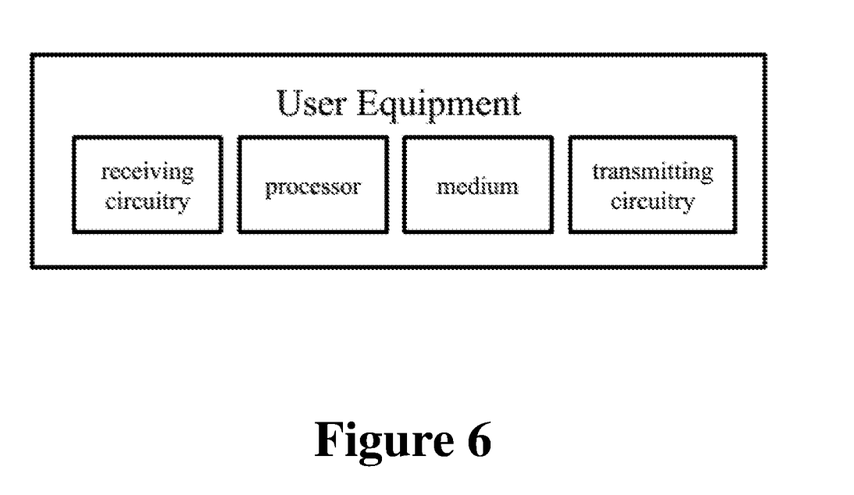
FIG. 6 depicts a block diagram of a UE according to the embodiments of the subject disclosure.

FIG. 6 illustrates a block diagram of a UE according to some embodiments of the subject disclosure. The UE may include a receiving circuitry, a processor, and a transmitting circuitry. In one embodiment, the UE may include a non-transitory computer-readable medium having stored thereon computer-executable instructions; a receiving circuitry; a transmitting circuitry; and a processor coupled to the non-transitory computer-readable medium, the receiving circuitry and the transmitting circuitry. The computer executable instructions can be programmed to implement a method (e.g. the method in FIG. 4) with the receiving circuitry, the transmitting circuitry and the processor.

Figure 7:
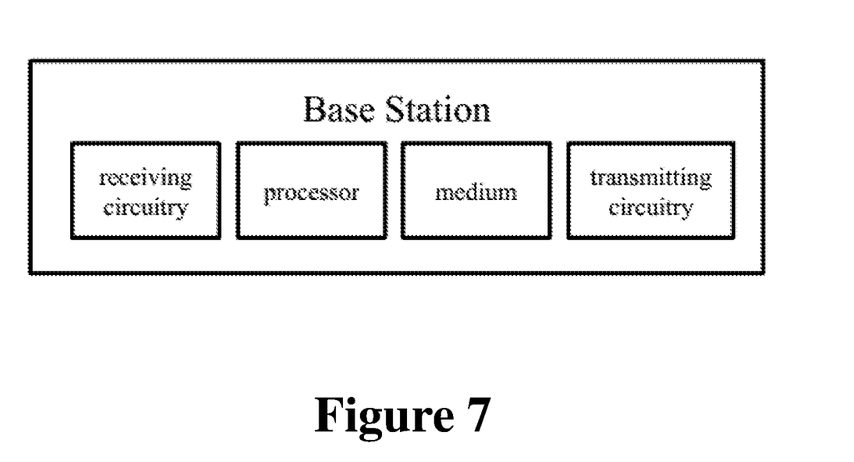
FIG. 7 depicts a block diagram of a BS according to the embodiments of the subject disclosure.

FIG. 7 illustrates a block diagram of a BS according to some embodiments of the subject disclosure. The BS may include a receiving circuitry, a processor, and a transmitting circuitry. In one embodiment, the BS may include a non-transitory computer-readable medium having stored thereon computer-executable instructions; a receiving circuitry; a transmitting circuitry; and a processor coupled to the non-transitory computer-readable medium, the receiving circuitry and the transmitting circuitry. The computer executable instructions can be programmed to implement a method (e.g. the method in FIG. 5) with the receiving circuitry, the transmitting circuitry and the processor.

The method of the present disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this disclosure, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A method for sidelink communication performed by a first user equipment (UE), the method comprising:
receiving, from a second UE, a request for one or more sidelink Discontinuous Reception (DRX) configurations, wherein the request includes assisting information;
transmitting the one or more sidelink DRX configurations determined based on the assisting information to the second UE; and
monitoring for sidelink communications during each on duration associated with each destination identity (ID) of the first UE, wherein each on duration and each destination ID correspond to the one or more sidelink DRX configurations, and wherein a destination ID corresponds to a service of the first UE.

2. The method of claim 1, wherein the first UE is configured with one or more initial sidelink DRX configurations, which are broadcasted in a System Information Block (SIB), transmitted with dedicate Radio Resource Control (RRC) signaling, or pre-configured.

3. The method of claim 1, further comprising:
transmitting, by the second UE, the one or more determined sidelink DRX configurations to a base station.

4. A first user equipment (UE) for sidelink communication, comprising:
at least one memory; and
at least one processor coupled with the at least one memory and configured to cause the first UE to:
receive, from a second UE, a request for one or more sidelink Discontinuous Reception (DRX) configurations, wherein the request includes assisting information;
transmit the one or more sidelink DRX configurations determined based on the assisting information to the UE; and
monitor for sidelink communications during each on duration associated with each destination identity (ID) of the first UE, wherein each on duration and each destination ID correspond to the one or more sidelink DRX configurations, and wherein a destination ID corresponds to a service of the first UE.

5. The first UE of claim 4, wherein the first UE is configured with one or more initial sidelink DRX configurations, which are broadcasted in a System Information Block (SIB), transmitted with dedicate Radio Resource Control (RRC) signaling, or pre-configured.

6. The first UE of claim 5, wherein each sidelink DRX configuration or each initial each sidelink DRX configuration comprises at least one of:
on duration;
start offset of on duration;
inactive time;
Hybrid Automatic Repeat Request (HARQ) Round-trip delay (RTT) time;
HARQ retransmission time;
next reservation time; and
active time.

7. The first UE of claim 5, wherein each sidelink DRX configuration or each initial each sidelink DRX configuration is associated with at least one of:
one Sidelink Radio Bearer (SLRB) configuration and one SLRB identity (ID);
one Quality of Service (QOS) flow and one QoS flow ID;
one PC5 QOS Index (PQI);
one logical channel configuration and one logical channel ID;
one unicast link and unicast link ID;
one destination ID; and
one source ID.

8. The first UE of claim 5, wherein the at least one processor is further configured to cause the first UE to:
transmit the one or more initial sidelink DRX configurations to the second UE.

9. The first UE of claim 5, wherein the at least one processor is further configured to cause the first UE to:
  transmit the one or more initial sidelink DRX configurations to the second UE when the first UE is out of coverage of a first base station.

10. The first UE of claim 5, wherein the at least one processor is further configured to cause the first UE to:
  transmit an additional request for the one or more sidelink DRX configurations to a first base station; and
  determine the one or more sidelink DRX configurations based on a response from the first base station.

11. The first UE of claim 10, wherein the at least one processor is further configured to cause the first UE to:
  initiate a Radio Resource Control (RRC) connection setup procedure with the first base station when the first UE is in coverage of the first base station and is in a third mode.

12. The first UE of claim 4, wherein each sidelink DRX configuration is associated with a resource pool configuration and a resource pool identity (ID).

13. The first UE of claim 12, wherein the first UE is free from entering into a first mode during an on duration associated with a sidelink DRX configuration when the sidelink DRX configuration is unaligned with a corresponding resource pool configuration.

14. The first UE of claim 4, wherein the first UE receives the request during or after a unicast connection between the first UE and the second UE being established.

15. The first UE of claim 4, wherein the assisting information comprises first type of parameters indicating requirements of the second UE.

16. The first UE of claim 4, wherein the assisting information comprises second type of parameters indicating the DRX configuration between the second UE and a second base station.

17. The first UE of claim 16, wherein the second type of parameters comprise at least one of a DRX configuration in a second mode, and/or or a DRX configuration in a third mode.

18. A first base station for sidelink communication, comprising:
  at least one memory; and
  at least one processor coupled with the at least one memory and configured to cause the first base station to:
    receive, from a first user equipment (UE), a request for one or more sidelink DRX configurations, wherein the request includes assisting information, and wherein the one or more sidelink DRX configurations correspond to each on duration and each destination identity (ID) of the first UE, wherein a destination ID corresponds to a service of the first UE; and
    determine a response based on the assisting information.

19. The first base station of claim 18, wherein the assisting information comprises a first type of parameters indicating requirements of a second UE.

20. The first base station of claim 18, wherein the assisting information comprises a second type of parameters indicating a DRX configuration between a second UE and a second base station.

* * * * *